(12) United States Patent
Alden

(10) Patent No.: US 7,395,090 B2
(45) Date of Patent: Jul. 1, 2008

(54) PERSONAL PORTABLE INTEGRATOR FOR MUSIC PLAYER AND MOBILE PHONE

(75) Inventor: Richard P. Alden, Park City, UT (US)

(73) Assignee: Skullcandy, Inc., Park City, UT (US)

( * ) Notice: Subject to any disclaimer, the term of this patent is extended or adjusted under 35 U.S.C. 154(b) by 13 days.

(21) Appl. No.: 11/548,195

(22) Filed: Oct. 10, 2006

(65) Prior Publication Data

US 2007/0142025 A1  Jun. 21, 2007

Related U.S. Application Data

(63) Continuation of application No. 10/382,960, filed on Mar. 6, 2003, now Pat. No. 7,187,948.

(60) Provisional application No. 60/370,711, filed on Apr. 9, 2002.

(51) Int. Cl.
*H04B 5/00* (2006.01)

(52) U.S. Cl. ............ 455/557; 455/569.1; 381/74; 381/79

(58) Field of Classification Search ........... 455/569.1, 455/575.1, 575.2, 90.3, 557, 426.1, 344; 381/74, 79, 123
See application file for complete search history.

(56) References Cited

U.S. PATENT DOCUMENTS

| | | | |
|---|---|---|---|
| 4,517,413 A | 5/1985 | Pavitt, Jr. | |
| 4,653,087 A | 3/1987 | Galich | |
| 5,099,514 A | 3/1992 | Acree | |
| 5,694,467 A | 12/1997 | Young, III | |
| 5,694,567 A | 12/1997 | Bourekas et al. | |
| 5,978,689 A | 11/1999 | Tuoriniemi et al. | |
| 6,006,115 A | 12/1999 | Wingate | |

(Continued)

FOREIGN PATENT DOCUMENTS

GB   2365692 A   2/2002

(Continued)

OTHER PUBLICATIONS

Office Action mailed Jul. 28, 2005 (Paper No. 20050605), U.S. Appl. No. 10/382,960, filed Mar. 6, 2003.

(Continued)

*Primary Examiner*—Blane J Jackson
(74) *Attorney, Agent, or Firm*—Workman Nydegger

(57) ABSTRACT

A personal portable integrator is used to integrate the services of an arbitrary audio delivery device such as an MP3, CD, DVD, radio, or other media player, with the services of an arbitrary two-way communication device such as a mobile phone, or a two-way radio such as a walkie-talkie, citizen band radio (e.g., CB), HAM radio, marine or aviation radio, and the like. The portable integrator receives and provides input and output signals from both the audio delivery device and the two-way communication device, thereby enabling a user to listen to music or other audio material and receive and place phone calls on a mobile phone simultaneously. The portable integrator provides these services by switching between the audio and communication devices, mixing signals received therefrom, and optionally enabling a user to reduce the volume or mute the signals as desired.

58 Claims, 8 Drawing Sheets

U.S. PATENT DOCUMENTS

| | | | |
|---|---|---|---|
| 6,091,812 | A | 7/2000 | Iglehart et al. |
| 6,397,087 | B1 | 5/2002 | Kim et al. |
| 6,519,475 | B1 | 2/2003 | Kim |
| 6,690,947 | B1 | 2/2004 | Tom |
| 6,985,592 | B1 * | 1/2006 | Ban et al. ............... 381/74 |
| 2001/0033666 | A1 | 10/2001 | Benz |
| 2001/0050991 | A1 | 12/2001 | Eves |
| 2002/0016188 | A1 * | 2/2002 | Kashiwamura ............ 455/568 |
| 2003/0043972 | A1 | 3/2003 | Burnham et al. |
| 2003/0073460 | A1 * | 4/2003 | van Pelt et al. ............ 455/556 |
| 2003/0079035 | A1 * | 4/2003 | Boyd et al. ............... 709/231 |
| 2003/0119566 | A1 | 6/2003 | Chen |
| 2004/0192402 | A1 | 9/2004 | Zatloukal et al. |

FOREIGN PATENT DOCUMENTS

| | | | |
|---|---|---|---|
| WO | 2003099061 | A | 12/2003 |
| WO | 2004025829 | A | 3/2004 |
| WO | 2004017141 | A | 12/2004 |

OTHER PUBLICATIONS

Office Action mailed Dec. 23, 2005 (Paper No. 20051105), U.S. Appl. No. 10/382,960, filed Mar. 6, 2003.

Office Action mailed Sep. 15, 2006 (Paper No. 20060804), U.S. Appl. No. 10/382,960, filed Mar. 6, 2003.

Office Action mailed Dec. 18, 2006 (Paper No. 20061111), U.S. Appl. No. 10/382,960, filed Mar. 6, 2003.

Alphaomegatele.com, [online] [retrieved Jan. 23, 2003]. Retrieved from the Internet URL: http://www.alphaomegatele.com/product-main.htm, pp. 1-4.

Digital Living Today, [online] [retrieved Sep. 18, 2002]. Retrieved from the Internet URL: http://netscape.digitallivingtoday.com/netscape/digitallifestiles/gizmo/mp3_phonehome (1 pg).

Amazon.com, [online] [retrieved Sep. 18, 2002]. Retrieved from the Internet URL: http://www.amazon.com/exec/obidos/tg/stores/detail/-/wireless/B000056C5H/ref=pd_sbs_..., pp. 1-3.

Motorola/Verizon Wireless brochure featuring Motorola Products, copyright Motorola, Inc. 2002 [online]. Retrieved from the Internet URL: www.verizonwireless.com, 2 pgs.

Pro 3000 Intercoms and Autocom Headsets, MFG: Autocom Products Ltd, Published Brochure (Dated Aug. 7, 1997) [online][retrieved Aug. 4, 2006. Retrieved from the Internet URL: http://web.archive.org/web/20000304054525/www.autocom.co.uk/pro3000.htm. 14 pgs.

"The Best and/or Smartest Intercom," DRE Communications Inc., San Jose, California, product brochure of the DRE-404e, 4-place Portable Intercom System (Dated Apr. 1994) [online][retrieved Jun. 23, 2005]. Retrieved from the Internet URL: http://www.drecomm.com/404product.htm. 5pgs.

"The Ultimate Expandable Rider Audio/Communication Systems,"Autocom Specialist Communications, Warwick England, product brochure of the Active-Rider Kit 3—Digital File Creation Date: Jun. 1, 2005, 8 pgs.

Pro 7 Sport, Instruction Manual and Warranty, Autocom Specialist Communications, Warwick, England, Digital File Creation Date: May 29, 2003, 6 pgs.

* cited by examiner

PERSONAL PORTABLE INTEGRATOR FOR MUSIC PLAYER AND MOBILE PHONE

CROSS-REFERENCE TO RELATED APPLICATIONS

The present invention is a continuation of U.S. patent application Ser. No. 10/382,960, filed on Mar. 6, 2003, entitled "PERSONAL PORTABLE INTEGRATOR FOR MUSIC PLAYER AND MOBILE PHONE," which claims the benefit of priority to U.S. Provisional Patent Application No. 60/370,711, filed on Apr. 9, 2002, entitled "SPLIT STYLE HEADPHONES." The entire content of each of the aforementioned patent applications is incorporated herein by reference.

BACKGROUND OF THE INVENTION

1. The Field of the Invention

This invention relates to integrating electronic devices and, more particularly, to novel systems and methods for integrating services provided by personal music players and mobile phones.

2. Background and Relevant Art

The use of mobile telephones and other wireless communication devices has increased dramatically in recent years. Likewise, electronic music players, such as MP3, CD, DVD, and like players have proliferated. Some companies have attempted to integrate music players and mobile two-way communication devices into single devices. While integration may reduce the number of devices a user is required to carry, a user may unnecessarily discard devices that are still fully functional, incurring unnecessary expense.

With respect to music players and mobile phones, various conflicts may arise when attempting to operate independent devices simultaneously. For example, users may listen to portable music players while exercising, traveling, working, relaxing, and performing like activities. However, users may desire to simultaneously place and receive phone calls, activities that may be inherently difficult to perform while listening to music or other audio material. For example, a user may be unable to hear a phone ring while listening to music using headphones, earphones, or the like. Moreover, if a user is able to accept a call, the user may be required to remove headphones, reduce the volume of or mute a music player, pick up a mobile phone handset, or like actions, in order to accept or place a call. This may be an excessively clumsy process.

What is needed is apparatus and methods for users to simultaneously accept and place phone calls using a mobile phone or other two-communication device while listening to music, or other audio material using an independent audio delivery device.

What is further needed is apparatus and methods to integrate the services of substantially any arbitrary two-way communication device with substantially any arbitrary music or audio delivery device.

BRIEF SUMMARY OF THE INVENTION

A primary object of the present invention is to provide apparatus and methods for integrating two-way communication devices with audio delivery devices. An apparatus in accordance with the invention may include a first electrical connector connected to receive a first audio signal from a substantially arbitrarily selectable audio delivery device, such as an MP3, CD, DVD, radio, or other media player. A second electrical connector may be connected to receive a second audio signal from a substantially arbitrarily selectable two-way communication device, such as a mobile phone, or a two-way radio such as a walkie-talkie, citizen band radio (e.g., CB), HAM radio, marine and aviation radio, and the like.

A coupling device independent from the audio and two-way communication devices may be connected to receive the first and second audio signals. A third audio signal comprising at least one of the first and second audio signals may be transmitted from the coupling device to an acoustic device, such as headphones, earphones, speakers, or the like to convert the third audio signal to an acoustic wave having an audio range corresponding to a hearing range of a user.

In certain embodiments, a switch may be connected to the apparatus to enable a user to selectively switch between the first and second audio signals to provide the third audio signal to the acoustic device. In other embodiments, a mixer may be connected to the apparatus to mix the first and second audio signals to create the third audio signal.

In selected embodiments, the apparatus may include a microphone connected to transmit a voice signal of a user to the two-way communication device. Thus, the two-way communication device may be located away from the face of the user. The apparatus may also include a volume controller connected to selectively control the volume of at least one of the first and second audio signals. In certain embodiments, the volume controller may control the first audio signal (e.g., the audio signal originating from the audio delivery device) so that a user may selectively raise or lower the volume of the music or other media while receiving or placing a call.

In selected embodiments, the apparatus may employ electrical wiring to route the audio signals and the voice signal to and from the coupling device. A switch, selectively operable by a user, may be used to connect at least two of the second audio signal wire, the voice signal wire, and a ground wire, to activate a function of the two-way communication device. For example, if the two-way communication device is a mobile phone, the switch may be used to trigger a function of the mobile phone such as a mute command, a call connect command, a call disconnect command, voice-activated dialing, a command to call the last number dialed, and the like.

The coupling device may contain any or all of the hardware previously described including but not limited to the microphone, the switches, the mixer, and the volume controller. In selected embodiments, the audio signal from the two-way communication device may be characterized by a threshold value. The second audio signal may be accorded priority relative to the first audio signal originating from the audio delivery device. Thus, the second audio signal may interrupt the first audio signal upon reaching the threshold value.

BRIEF DESCRIPTION OF THE DRAWINGS

The objects and features of the present invention will become more fully apparent from the following description, taken in conjunction with the accompanying drawings. Understanding that these drawings depict only typical embodiments of the invention and are, therefore, not to be considered limiting of its scope, the invention will be described with additional specificity and detail through use of the accompanying drawings in which.

DETAILED DESCRIPTION OF THE PREFERRED EMBODIMENTS

It will be readily understood that the components of the present invention, as generally described and illustrated in FIGS. 1 through 8 herein, could be arranged and designed in a wide variety of different configurations. Thus, the description herein is not intended to limit the scope of the invention, but is merely representative of certain presently preferred embodiments of devices and systems in accordance with the invention. Those of ordinary skill in the art will, of course, appreciate that various modifications to the details herein may easily be made without departing from the essential characteristics of the invention, as described. Thus, the following information is intended only by way of example, and simply illustrates certain presently preferred embodiments consistent with the invention.

Figure 1:
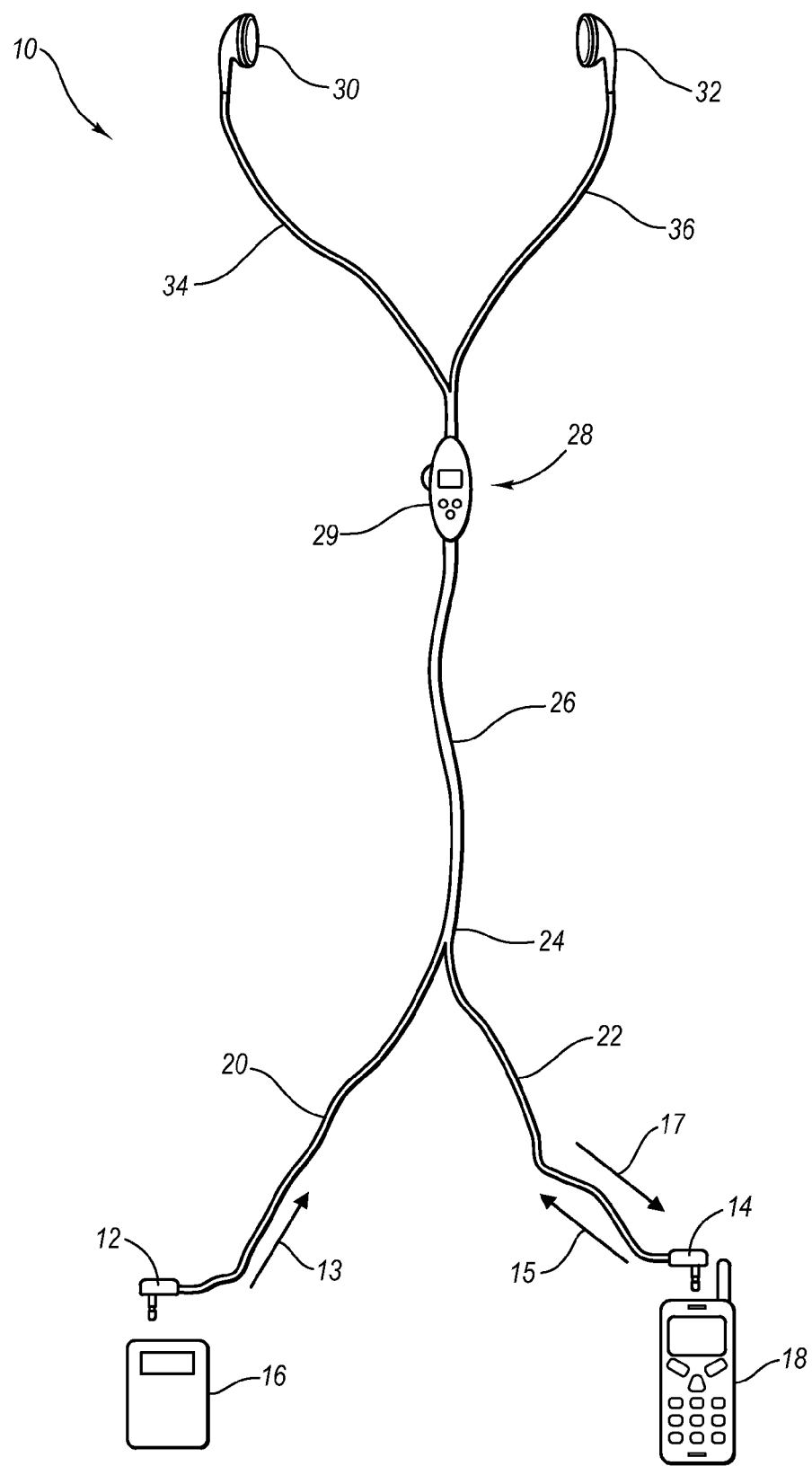
FIG. 1 is a plan view of one embodiment of a personal portable integrator usable with a music player and a mobile phone.

Referring to FIG. 1, a portable integrator 10 for use with a two-communication device 18, such as a mobile phone 18, and an audio delivery device 16, such as a portable MP3 player or CD player, may include electrical connectors 12, 14 to interface with the devices 16, 18. The electrical connectors 12, 14 may vary according to the device. For example, an audio device 16 may require a jack 12 having specific dimensions and with a specified number of contact points. Likewise, a connector 14 may connect to a particular communication device 18. The connectors 12, 14 may be modified as needed to adapt to other devices 16, 18.

The connectors 12, 14 may be adapted to receive and provide signals 13, 15, 17 from the devices 16, 18. For example, the connector 12 may simply receive an audio signal 13 from the audio device 16. The signal 13 may be a monophonic, stereophonic, or like representation of an audio signal 13. Likewise, the connector 14 may receive an audio signal 15 from the communication device 18. In addition, the connector 14 may provide a voice signal 17, or other input signal 17, to the communication device 18 from a user thereof or other outside source.

Sheathed flexible wires 20, 22 or other transmission means such as optical fibers 20, 22, or wireless technology such as Bluetooth may be used to carry the signals 13, 15, 17 to and from the devices 16, 18. In certain embodiments, a reinforcement member 24 may be used to provide strength at a junction point 24 of the lines 20, 22. The reinforcement member 24 may also be used to form a transition point 24 where wires 20, 22 may be bundled together beneath a single protective sheathing 26.

A coupling device 28 may receive and transmit the signals 13, 15, 17 through the path 26. The coupling device 28 may act as a controller 28 or hub 28 to route the signals 13, 15, 17 to an acoustic device 30, 32, such as headphones 30, 32, earphones 30, 32, speakers 30, 32, or the like. The coupling device 28 may also contain a microphone 29, thus providing a hands free set 29, 30, 32, usable with a mobile phone 18. A pair of wires 34, 36 or other communication paths 34, 36 may connect the coupling device 28 to the acoustic device 30, 32.

Figure 2:
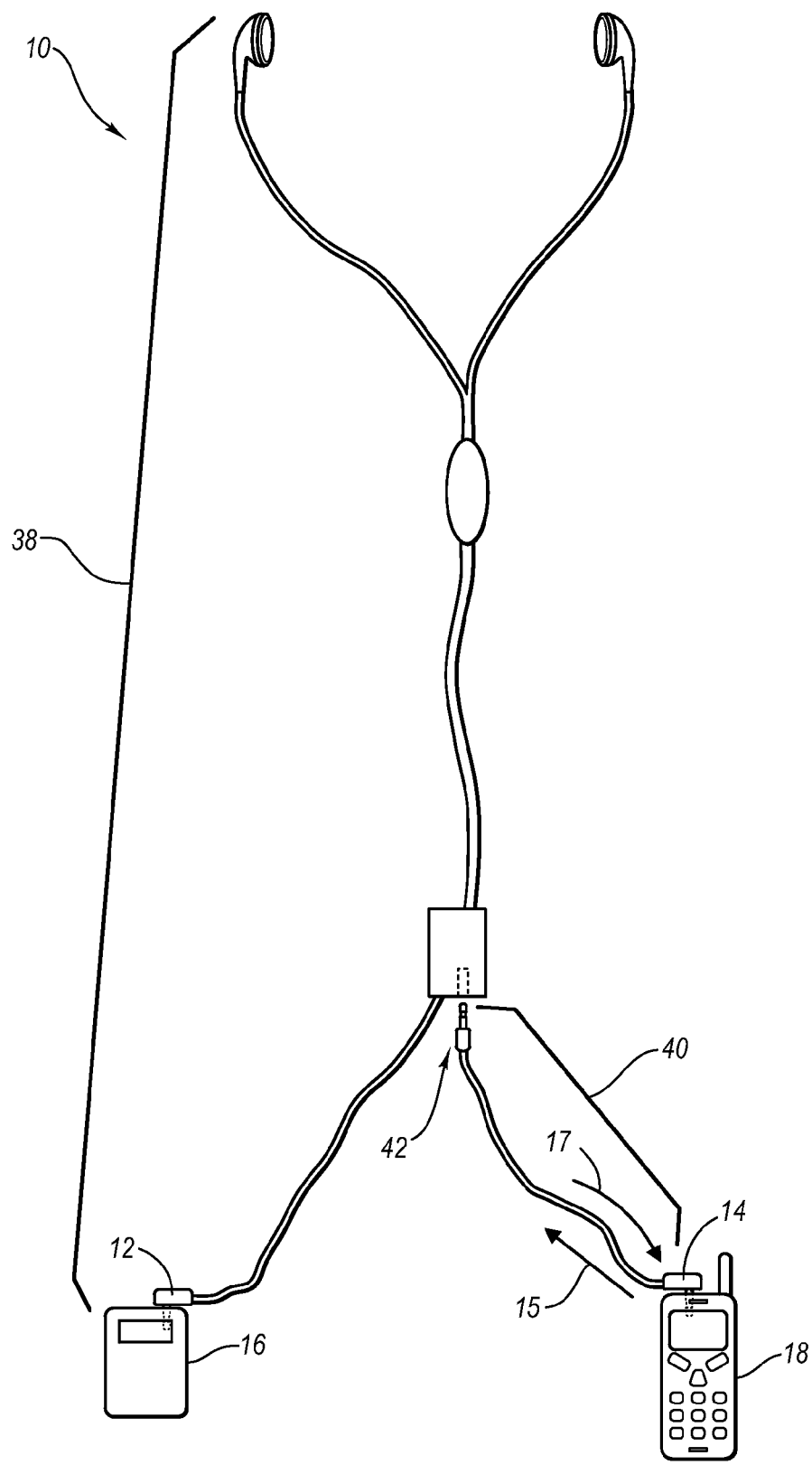
FIG. 2 is a plan view of one embodiment of a personal portable integrator having a device-specific link to a two-way communication device.

Referring to FIG. 2, as was previously mentioned, devices 16, 18, such as mobile phones 18, may not use a standardized jack 12, 14. However, it may be undesirable to provide a separate integrator device 10 for each variation of devices 12, 14 that may be available. Therefore, in certain embodiments, a portion 38 of the portable integrator 10 may be provided as a universal component 38 while another portion 40 may serve as a device-specific component 40. For example, audio devices 16 may use a standardized connector 12 or jack 12. Therefore, a universal component 38 may adapt to the vast majority of audio devices 16 that may be available. Conversely, many two-way communication devices 18, such as mobile phones 18 may not have standardized connections 14. Therefore, device-specific components 40 may be provided having a standard connection 42 that may interface with the universal component 38, while another adapter 14 or connector 14 may be specific to the device 18.

In cases where devices 18 may have a varying number of inputs 17 and outputs 15, dead pins, wires (communication paths), and the like may by used as needed to increase or decrease the number of inputs 15 or outputs 17 according to specific devices 18. In addition, a user may only desire to use a single device 16 for a given period of time and may wish to remove the portion 40 until it is needed.

Figure 3:
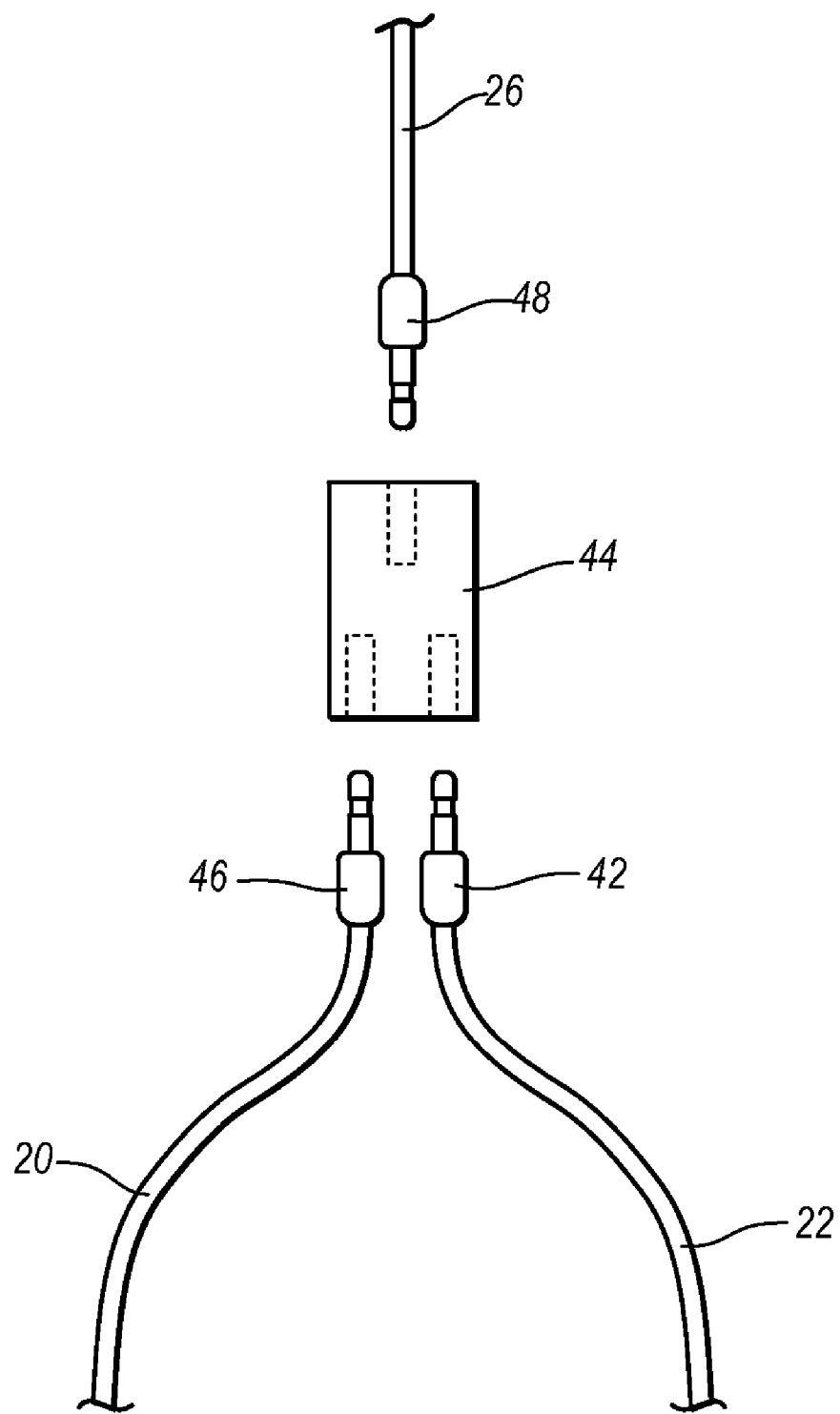
FIG. 3 is a schematic block diagram illustrating one embodiment of connectors that may be used to adapt the invention to a wide variety of devices.

Referring to FIG. 3, while continuing to refer generally to FIGS. 1 and 2, adaptability of the integrator device 10 may be provided in various ways. For example, in certain embodiments, the integrator device 10 may include an adapter 44 that may provide an interface 44 to each of the devices 12, 18, 28. In selected embodiments, a connection 20 to an audio device 16 may be swapped with another connection 20 fitted for another device 16, a connection 22 to a communication device 18 may be swapped with another connection 22 fitted for another communication device 18, a coupling device 28 and an acoustic device 30,32 may be swapped with other devices 28, 30, 32, and the like. As was previously mentioned, certain portions 26,20, 22 may be added or deleted as needed by the user. The adapter 44 may use a variety of connectors 42, 46, 48 to connect to the adapter 44. In certain embodiments, the adapter 44 may wirelessly communicate with each of the devices 16,18 using a wireless technology, thereby acting as a wireless communication hub 44.

Figure 4:
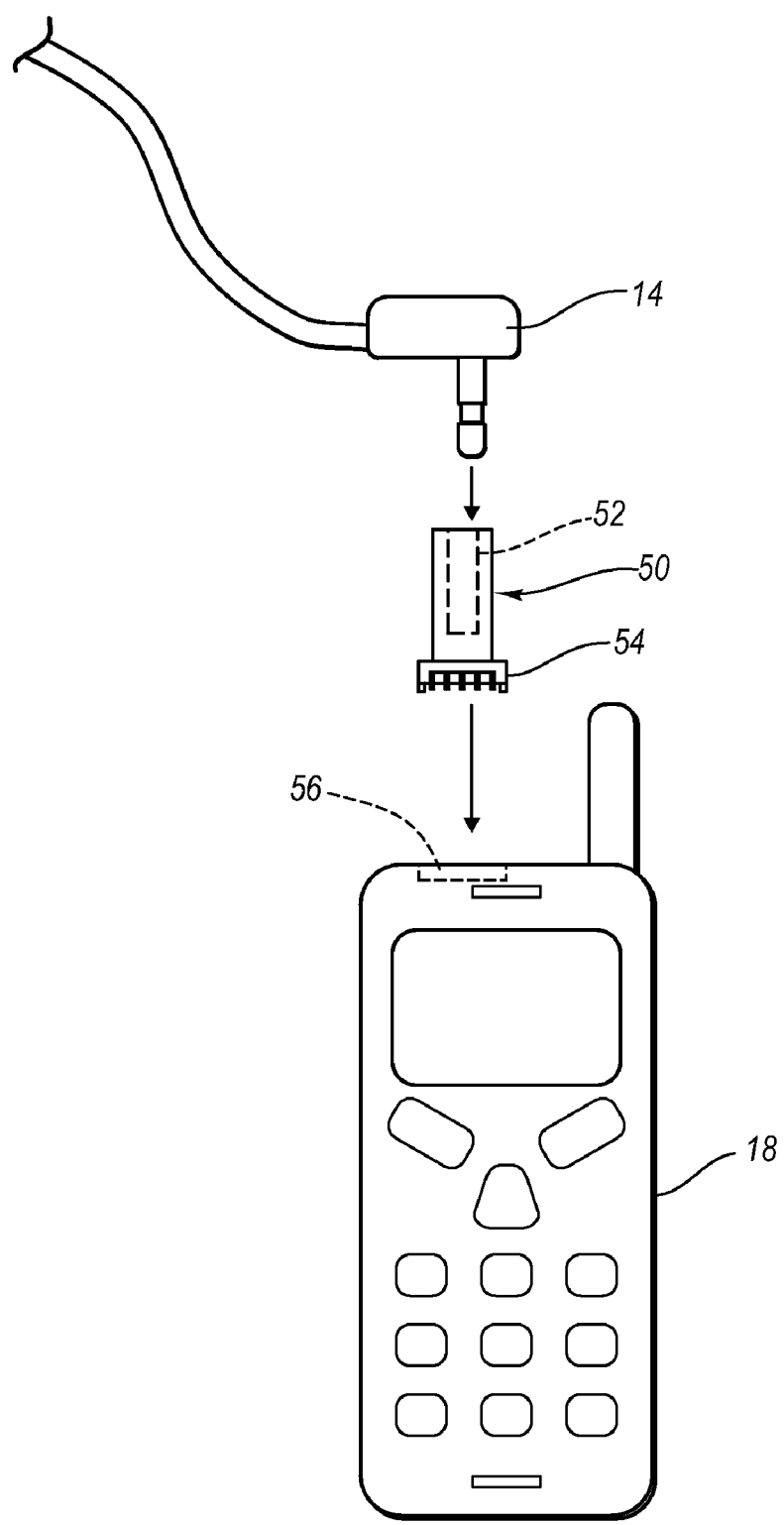
FIG. 4 is a schematic block diagram of one embodiment of an adapter that may be used to interface to a specific device.

Referring to FIG. 4, in selected embodiments, adapters 50 may be provided in accordance with the invention to adapt a portable integrator 10 to specific devices 18. For example, an adapter 50 may include an interface 52 for interfacing with a connector 14. Likewise, the adapter 50 may include another interface 54 that may connect directly to a device 18 at an input 56. In addition, other features may be built into the adapter 50 such as impedance matching, signal amplification, and the like.

Figure 5:
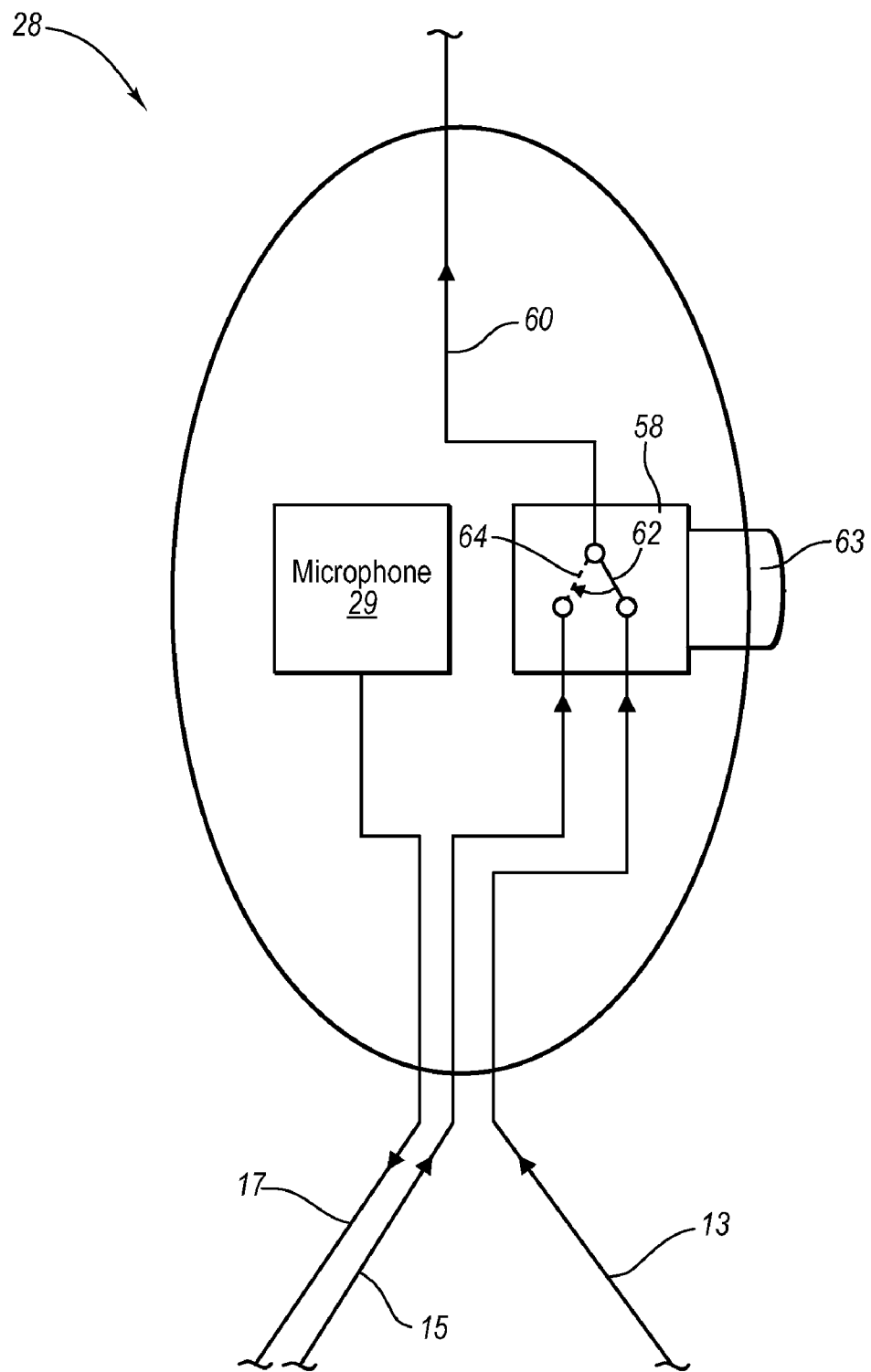
FIG. 5 is a schematic block diagram of one embodiment of components contained within a coupling device in accordance with the invention.

Referring to FIG. 5, in certain embodiments, the coupling device 28 may include a switch 58 to selectively enable a user to connect one of the signals 13, 15 through to the output 60. For example, a user may listen to an audio recording or live transmission from an audio device 16 with the switch 58 in a first position 62. If the user receives or desires to place a call, the switch 58 may be changed to a second position 64 to connect the communication device 18 through to the output 60. The switch 58 may include a button 63 or like mechanism 63 to enable a user operation thereof. Thus, the signal 13 from the audio device 16 may be conveniently and selectively disconnected while the user operates the communication device 18. In this way, simple operation of a switch 58 may enable a user to operate an audio delivery device 16 and a communication device 18 through a single acoustic device 30, 32.

The coupling device 28 may also include a microphone 29 to transmit a voice or other audio signal 17 back to the communication device 18. The coupling device 28 may contain one or several apertures to permit an acoustic wave to directly enter and drive the microphone 29. In certain embodiments, the coupling device 28 may be located, such as by clipping, proximate the face of a user so that the switch 58, microphone 29, and other controls located therein, may be easily accessed and used by a user. Likewise, the communication device 18 and audio device 16 may be located away from the user's face, clipped along a belt line, in a pocket, in a bag, or the like.

Figure 6:
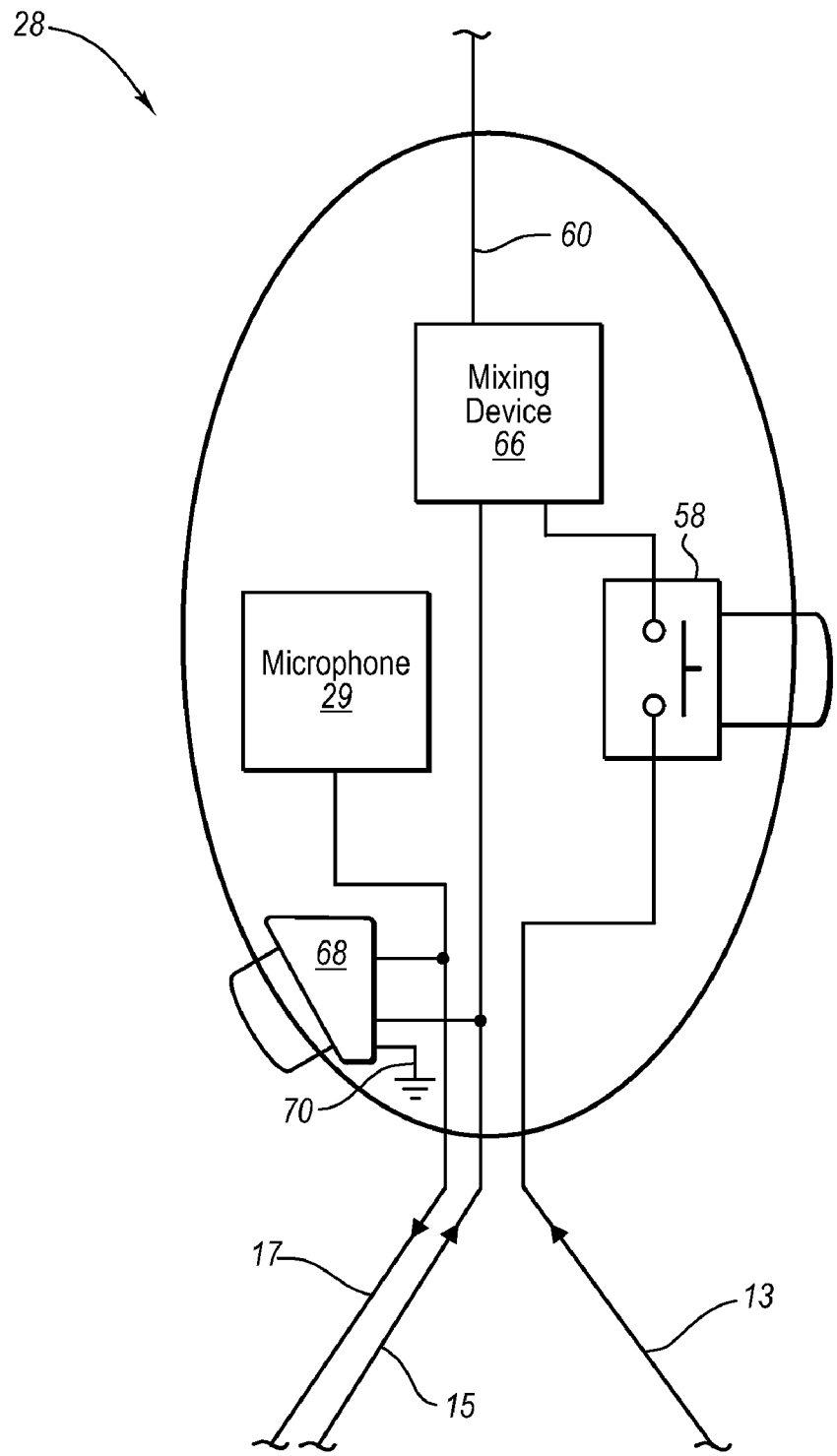
FIG. 6 is a schematic block diagram of an alternative embodiment of components contained within a coupling device in accordance with the invention.

Referring to FIG. 6, in certain embodiments, the coupling device 28 may include a mixer 66 to mix the audio signals 13, 15 originating from the audio and communication devices 16,18. Thus, the audio signals 13, 15 may be heard simultaneously by a user through an acoustic device 30, 32. In certain instances, a ring or other sound may indicate a call is being received by the communication device 18 and may by audible over the sound of the music or other media through the acoustic device 30, 32. In this case, the audio signal 13 from the audio device 16 may be muted or disconnected by a user with a switch 58 while the user receives or places a call. Once the call is finished, the user may once again trigger the switch to begin listening to music or other audible media. Thus, a user may simultaneously hear and monitor both devices 16, 18 through a single acoustic device 30, 32 and may mute or disconnect at least one of the devices 16, 18 when needed.

In certain embodiments, the coupling device 28 may also include a switch 68 or other control device 68 to control features of the communication device 18, the audio device 16, or a combination thereof. For example, a switch 68 may connect inputs 17 or outputs 15 of the communication device 18 together, connect them to a ground 70, provide control signals to the device 18, or the like, to control features of the communication device 18. For example, a switch 68 or control device 68 may control features of the communication device 18 such as performing a mute command, a call connect command, a call disconnect command, voice-activated dialing, a command to call the last number dialed, or like features. The features activated may vary from device 18 to device 18 and may depend on the device engineering and configuration.

Figure 7:
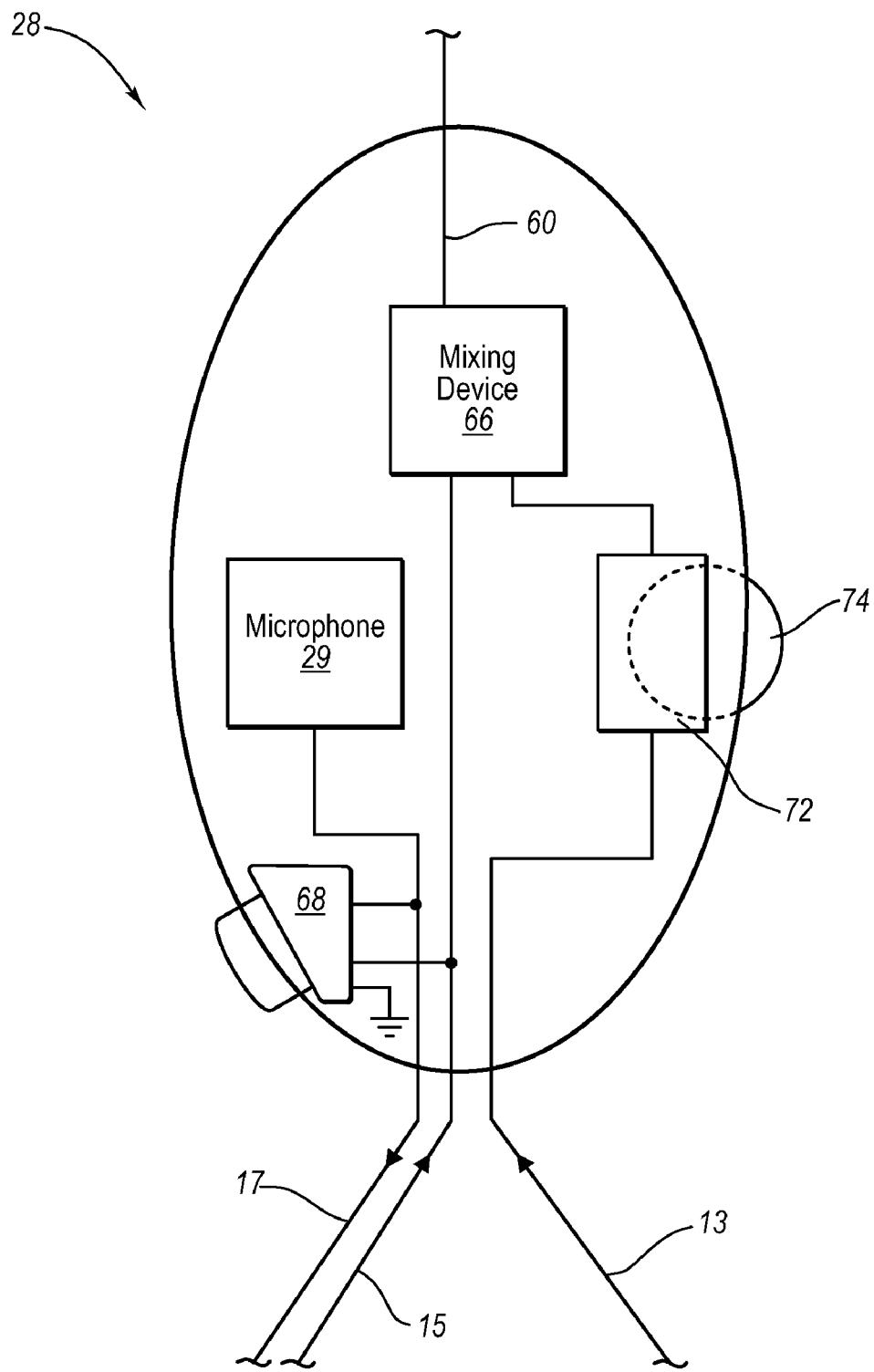
FIG. 7 is a schematic block diagram of another alternative embodiment of components contained within a coupling device in accordance with the invention.

Referring to FIG. 7, in selected embodiments, the coupling device 28 may include a volume controller 72 to control the volume of at least one of the audio signals 13, 15 from the audio device 16 and the communication device 18. For example, as in the previous example, a mixer 66 may provide that audio signals 13, 15 be heard simultaneously by a user through an acoustic device 30, 32. When a call is received or placed on the communication device 18, a user may adjust the volume of the audio signal 13 using the volume controller 72. If desired, the user may adjust the volume such that music or audio material is still heard in the background while receiving or placing a call. Once a call is finished, a user may readjust the volume to a desired level. Thus, a user may simultaneously hear and monitor both devices through a single acoustic device 30, 32, and may adjust the volume of at least one of the devices 16, 18 when desired.

Figure 8:
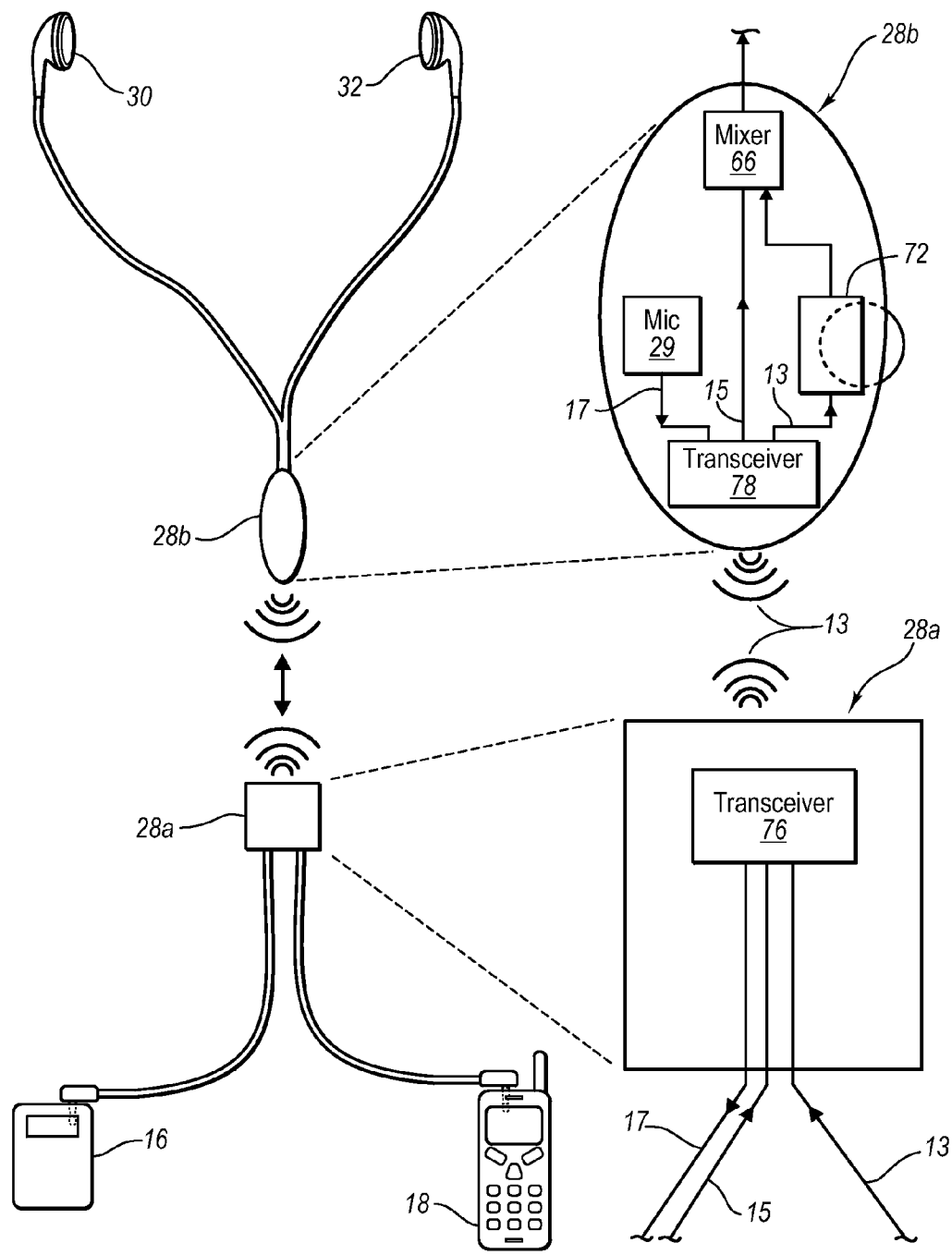
FIG. 8 is a schematic block diagram of one embodiment of a personal portable integrator usable with a music player and a mobile phone using wireless technology.

Referring to FIG. 8, in certain embodiments, a coupling device 28 may be divided into a pair of components 28a, 28b that wirelessly communicate with one another using a technology such as Bluetooth. For example, a first component 28a may include a transceiver 76 receptive to the signals 13, 15, 17 from the audio and communication devices 16, 18. The transceiver 76 may convert these signals to wirelessly transmittable frequencies 80 using an appropriate wireless protocol such that they may be transmitted to a peer transceiver 78. The transceiver 78 may then convert the frequencies 80 back to signals 13, 15, 17, where they may be processed by the coupling device 28b in accordance with a process like those described in FIGS. 5 through 7.

One of ordinary skill in the art will recognize that the wireless technology described in FIG. 8 may be used in a wide variety of different configurations and the example presented herein is not intended to limit the scope of the invention. For example, in certain embodiments, portions or all of the circuitry 29, 66, 72 or components 29, 66, 72 may be located in the housing 28a. In other embodiments, each of the devices 16, 18, may communicate wirelessly with the coupling device 28, 28a or 28b.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes within the meaning and range of equivalency of the claims are to be embraced within their scope.

I claim:

1. A portable apparatus for integrating a two-way communication device and an audio delivery device, wherein the portable apparatus is configured in size and shape to be portably carried in either a hand of a user or an article of clothing during use of the portable apparatus, the apparatus comprising:

a first electrical connector configured to receive a first audio signal from a substantially arbitrarily selectable audio delivery device;

a second electrical connector configured to receive a second audio signal from a substantially arbitrarily selectable two-way communication device;

a coupling device independent from the audio and two-way communication devices, the coupling device connected to receive the first and second audio signals, and to transmit a third audio signal comprising at least one of the first or second audio signals; and an acoustic device adapted to convert the third audio signal to an acoustic wave having an audio range corresponding to a hearing range of a user;

wherein:

the coupling device comprises at least two physically separate devices; and the at least two physically separate devices comprise means for enabling wireless communication between the at least two physically separate devices.

2. The portable apparatus as recited in claim 1, further comprising a first switch connected to selectively switch between the first and second audio signals to provide the third audio signal.

3. The portable apparatus as recited in claim 1, the apparatus further comprising a volume controller connected to selectively control the volume of at least one of the first or second audio signals.

4. The portable apparatus as recited in claim 1, wherein:

at least one of the physically separate devices is remotely disposed from both of said first and second electrical connectors; and another of the physically separate devices is connected to one or both of the first and second electrical connectors with wired or optical connection means.

5. The portable apparatus as recited in claim 1, wherein at least one of the first or second electrical connectors is physically detached from the coupling device and wirelessly communicates with the coupling device.

6. The portable apparatus as recited in claim 1, wherein the coupling device is proximate the face of a user.

7. The portable apparatus as recited in claim 1, wherein the coupling device contains at least one of a microphone, a switch, a mixer, or a volume controller.

8. The portable apparatus as recited in claim 1, wherein the first and second electrical connectors comprise jacks that each have a male terminal end.

9. The portable apparatus as recited in claim 1, wherein only one of the first and second electrical connectors is detachably connected to the coupling device with a flexible wire.

10. The portable apparatus as recited in claim 1, wherein the coupling device is detachably connectable to both of the audio and two-way communications devices with the first and second electrical connectors, respectively.

11. The portable apparatus as recited in claim 1, further comprising a mixer connected to mix the first and second audio signals to create the third audio signal.

12. The portable apparatus as recited in claim 11, wherein the coupling device comprises a mixing controller for selectably adjusting and controlling a mixing weight of the first or second audio signals as they are mixed by the mixer into the third audio signal.

13. The portable apparatus as recited in claim 12, wherein the mixing controller enables volume of a selected one of the first and second audio signals to be selectively reduced without being muted during a simultaneous use of both the audio and two-way communication devices during which both the first and second audio signals are audible as part of the third audio signal during the simultaneous use.

14. The portable apparatus as recited in claim 1, further comprising a microphone connected to transmit a voice signal to the two-way communication device.

15. The portable apparatus as recited in claim 14, further comprising means for adjusting a volume associated with the microphone.

16. The portable apparatus as recited in claim 1, further comprising:
a switch configured to activate a function of the two-way communication device; wherein:
the two-way communication device is a mobile phone; and
the function is selected from the group consisting of a mute command, a call connect command, a call disconnect command, voice-activated dialing, and a command to call the last number dialed.

17. An article of manufacture configured to receive the portable apparatus as recited in claim 1, wherein:
the portable apparatus is available by accessing an article of manufacture into which the portable apparatus has been received; and
the coupling device comprises means for transmitting an input signal to one of the audio delivery device and the two-way communication devices.

18. The portable apparatus as recited in claim 17, wherein the article of manufacture includes any of an article of clothing and a portable carrier comprising a backpack.

19. The portable apparatus as recited in claim 17, wherein the coupling device is configured to receive the first or second audio signal over an optical medium.

20. The portable apparatus as recited in claim 17, wherein the coupling device is configured to transmit any of the first audio signal, the second audio signal, and the input signal over any of an optical, or wireless medium.

21. The portable apparatus as recited in claim 17, wherein the coupling device is integrally coupled to the acoustic device, such that the acoustic device and the coupling device are not physically separated.

22. The portable apparatus as recited in claim 17, wherein the apparatus is integrated within an article of clothing or a personal carrier device into which the audio delivery device, and the two-way communication device is integrated during use.

23. The portable apparatus as recited in claim 22, wherein the article of clothing comprises any of a jacket, a coat, or head gear including a helmet.

24. The portable apparatus as recited in claim 22, wherein the personal carrier comprises any of a backpack, or a belt pack.

25. A method for integrating a two-way communication device and an audio delivery device with a portable apparatus that is configured in size and shape to be portably carried in either a hand of a user or an article of clothing during use of the portable apparatus, the method comprising the portable apparatus performing the following:
receiving a first audio signal from a substantially arbitrarily selectable audio delivery device;
receiving a second audio signal from a substantially arbitrarily selectable two-way communication device;
receiving, by the portable apparatus, which is independent from the audio delivery and two-way communication device, the first and second audio signals, and transmitting a third audio signal comprising at least one of the first or second audio signals; and
converting the third audio signal to an acoustic wave having an audio range corresponding to a hearing range of a user;
wherein the portable apparatus communicates with both of the audio delivery device and two-way communication devices at the same time, and communicates at least two of the first, second, and third audio signals wirelessly.

26. The method of claim 25, further comprising transmitting a voice signal to the two-way communication device.

27. The method of claim 25, the method further comprising selectively controlling the volume of at least one of the first or second audio signals.

28. The method of claim 25, wherein the independent portable apparatus performs a task selected from the group consisting of switching between the first and second audio signals, mixing the first and second audio signals, transmitting the voice signal to the two-way communication device, and adjusting the volume of the first audio signal.

29. The method of claim 25, further comprising swapping the audio delivery device with a second audio delivery device.

30. The method of claim 25, further comprising:
connecting a switch with the two-way communication device to activate a function of the two-way communication device; wherein:
the two-way communication device is a mobile phone; and
the function is selected from the group consisting of a mute command, a call connect command, a call disconnect command, voice-activated dialing, and a command to call the last number dialed.

31. The method of claim 25, further comprising swapping the two-way communication device with a second two-way communication device.

32. The method of claim 25, wherein the portable apparatus communicates no more than two of the first audio signal, the second audio signal, and the third audio signal over any of an electrical or optical wire.

33. The method of claim 25, further comprising selectively switching between the first and second audio signals to provide the third audio signal.

34. The method of claim 33, further comprising mixing the first and second audio signals to create the third audio signal.

35. The apparatus as recited in claim 25, wherein the portable apparatus communicates no more than one of the first audio signal, the second audio signal, and the third audio signal over any of an electrical or optical wire.

36. A portable and wireless apparatus for wirelessly integrating a two-way communication device and an audio delivery device, wherein the portable and wireless apparatus is configured in size and shape to be portably carried in either a hand of a user or an article of clothing during use of the portable and wireless apparatus, the portable and wireless apparatus comprising:
   means for wirelessly receiving a first audio signal from a substantially arbitrarily selectable audio delivery device;
   means for wirelessly receiving a second audio signal from a substantially arbitrarily selectable two-way communication device;
   a coupling device independent from the audio and two-way communication devices, the coupling device comprising said means for receiving said first and second audio signals, said coupling means further comprising:
      means for transmitting a third audio signal comprising at least one of the first or second audio signals to an acoustic device adapted to convert the third acoustic wave to an audio range corresponding to a hearing range of a user;
      means for mixing the first and second audio signals into the third audio signal and for enabling simultaneous use of said audio and two-way communications devices.

37. An apparatus as recited in claim 36, further comprising means for selectably adjusting and controlling a mixing weight of the first and second audio signals as part of the third audio signal.

38. An apparatus as recited in claim 36, further comprising a first switch connected to selectively switch between the first and second audio signals to provide the third audio signal.

39. An apparatus as recited in claim 36, the apparatus further comprising a volume controller connected to selectively control the volume of at least one of the first or second audio signals.

40. An apparatus as recited in claim 36, wherein the coupling device is proximate the face of a user.

41. An apparatus as recited in claim 36, wherein the coupling device contains at least one of a microphone, a switch, a mixer, or a volume controller.

42. An apparatus as recited in claim 36, wherein one or both of the audio delivery device or the selectable two-way communication device communicates wirelessly through a wireless transceiver component that is physically connected to the audio delivery device or the selectable two-way communication device using an electrical connector.

43. An apparatus as recited in claim 36, further comprising a mixer connected to mix the first and second audio signals to create the third audio signal.

44. An apparatus as recited in claim 43, wherein the coupling device comprises a mixing controller for selectably adjusting and controlling a mixing weight of the first or second audio signals as they are mixed by the mixer into the third audio signal.

45. An apparatus as recited in claim 44, wherein the mixing controller enables volume of a selected one of the first and second audio signals to be selectively reduced without being muted during a simultaneous use of both the audio and two-way communication devices during which both the first and second audio signals are audible as part of the third audio signal during the simultaneous use.

46. An apparatus as recited in claim 36, further comprising a microphone connected to transmit a voice signal to the two-way communication device.

47. An apparatus as recited in claim 46, further comprising means for adjusting a volume associated with the microphone.

48. An apparatus as recited in claim 36, further comprising:
   a switch configured to activate a function of the two-way communication device; wherein:
      the two-way communication device is a mobile phone; and
      the function is selected from the group consisting of a mute command, a call connect command, a call disconnect command, voice-activated dialing, and a command to call the last number dialed.

49. An apparatus as recited in claim 36, wherein the coupling device comprises at least two physically separate devices.

50. An apparatus as recited in claim 49, wherein the at least two physically separate devices comprise means for enabling wireless communication between the at least two physically separate devices.

51. An apparatus as recited in claim 49, wherein one of the at least two physically separate devices is physically connected to one or both of the audio delivery device or the two-way communication device, such that the physically connected audio delivery device or the two-way communication device communicates wirelessly through the one of the at least two physically separate devices.

52. An article of manufacture configured to receive the apparatus as recited in claim 36, wherein:
   the apparatus is available by accessing an article of manufacture into which the portable apparatus has been received; and
   the coupling device comprises means for transmitting an input signal to one of the audio delivery device or the two-way communication device.

53. The apparatus as recited in claim 52, wherein the article of manufacture includes any of an article of clothing and a portable carrier.

54. The apparatus as recited in claim 52, wherein the coupling device is configured to receive the first or second audio signal over an optical medium or electrical wire before transmitting the third signal wirelessly.

55. The apparatus as recited in claim 52, wherein the coupling device is integrally coupled to the acoustic device, such that the acoustic device and the coupling device are not separated.

56. The apparatus as recited in claim 52, wherein the apparatus is integrated within an article of clothing or a personal carrier device into which the acoustic device is present during use.

57. The apparatus as recited in claim 56, wherein the article of clothing comprises any of a jacket, a coat, or head gear.

58. The apparatus as recited in claim 56, wherein the personal carrier comprises any of a backpack, or a belt pack.

* * * * *